United States Patent
Ambi et al.

(10) Patent No.: US 10,715,406 B2
(45) Date of Patent: Jul. 14, 2020

(54) FLOW SAMPLE

(71) Applicant: HEWLETT PACKARD ENTERPRISE DEVELOPMENT LP, Houston, TX (US)

(72) Inventors: Chetan Ambi, Bangalore (IN); Allu Ramaprasad, Bangalore (IN); Venkatavaradhan Devarajan, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 84 days.

(21) Appl. No.: 15/306,719

(22) PCT Filed: Apr. 24, 2015

(86) PCT No.: PCT/US2015/027547
§ 371 (c)(1),
(2) Date: Oct. 25, 2016

(87) PCT Pub. No.: WO2015/164765
PCT Pub. Date: Oct. 29, 2015

(65) Prior Publication Data
US 2017/0054609 A1    Feb. 23, 2017

(30) Foreign Application Priority Data

Apr. 25, 2014   (IN) .......................... 2113/CHE/2014

(51) Int. Cl.
| H04L 12/26 | (2006.01) |
| H04L 12/24 | (2006.01) |
| H04L 29/06 | (2006.01) |

(52) U.S. Cl.
CPC ............ H04L 43/022 (2013.01); H04L 41/06 (2013.01); H04L 41/147 (2013.01); H04L 69/22 (2013.01)

(58) Field of Classification Search
CPC ..... H04L 12/26; H04L 12/705; H04L 12/935; H04L 29/12; H04L 12/24; H04L 29/06
See application file for complete search history.

(56) References Cited

U.S. PATENT DOCUMENTS

| 2004/0114516 A1* | 6/2004 | Iwata ................... H04L 12/5602 370/230.1 |
| 2006/0251050 A1* | 11/2006 | Karlsson ........... H04L 29/06027 370/352 |
| 2007/0171824 A1 | 7/2007 | Ruello et al. |
| 2008/0196100 A1 | 8/2008 | Madhavan et al. |
| 2009/0180393 A1 | 7/2009 | Nakamura |
| 2013/0064243 A1* | 3/2013 | Akiyoshi ................ H04L 45/38 370/389 |

(Continued)

OTHER PUBLICATIONS

International Search Report and Written Opinion, International Application No. PCT/US2015/027547, dated Aug. 5, 2015, pp. 1-8, KIPO.

(Continued)

*Primary Examiner* — Anez C Ebrahim
(74) *Attorney, Agent, or Firm* — Hewlett Packard Enterprise Patent Department

(57) ABSTRACT

A network anomaly may be detected by comparing the network behavior of a packet to an expected network behavior. The network behavior may be determined using a packet sample of a packet matching a flow rule that includes a sampling rule.

13 Claims, 3 Drawing Sheets

(56) References Cited

U.S. PATENT DOCUMENTS

2014/0112150 A1* 4/2014 Ko .................... H04L 47/24
370/236
2015/0180775 A1* 6/2015 Hasegawa ............... H04L 45/08
370/392

OTHER PUBLICATIONS

K. Giotis et al., "Combining OpenFlow and sFlow for an Effective and Scalable Anomaly Detection and Mitigation Mechanism on SDN Environments," Computer Networks, Apr. 7, 2014, pp. 122-136, vol. 62, Elsevier.
S. Shirali-Shahreza and Y. Ganjali, "FleXam: Flexible Sampling Extension for Monitoring and Security Applications in OpenFlow," HotSDN'13, Aug. 16, 2013, Hong Kong, China, pp. 167-168, ACM.
Ying Zhang, "An Adaptive Flow Counting Method for Anomaly Detection in SDN," CoNEXT '13, Dec. 2013, pp. 25-30, ACM.

\* cited by examiner

FLOW SAMPLE

BACKGROUND

In networks using software defined networking (SDN), one or more network controllers may manage the control plane of network devices, such as switches, bridges and routers. The network controller may also manage the data plane of the switches by providing flow rules to the switches. The flow rules may have various attributes, such as match fields, meters, go-to instructions, and actions. A flow is a set of packets sharing common attributes. For example, a flow may be defined by layer 2 or link layer information, such as source or destination MAC address; layer 3 or network layer information, such as source or destination IP address; or other information such as frame type, class of service indicator, or frame control information. The match fields of a flow rule establish a corresponding flow by setting the attributes shared by packets of the flow. During operation, if a match field is met by a packet then the network device performs the action on the packet. Match fields may include various criteria, such as source or destination IP or MAC address, port numbers, transport protocol type, frame type, class of service indicators, or frame control information. Actions may include various operations that the switch can perform on packets, such as forwarding the packet to a specified port, dropping the packet, or forwarding the packet to the controller.

BRIEF DESCRIPTION OF THE DRAWINGS

Certain examples are described in the following detailed description and in reference to the drawings, in which.

DETAILED DESCRIPTION OF SPECIFIC EXAMPLES

Once a controller instantiates flow rules onto its network devices, the controller typically assumes that the desired flow behavior is followed in the network. For example, if an SDN application executed by the controller programs a particular network path, the controller may send a set of flow rules to the network devices to implement the path. Incorrectly programmed flow rules or unexpected behavior resulting from correctly programmed flow rules may result in various network anomalies. For example, a network anomaly might be an impediment preventing traffic from reaching its destination, such as a network loop. As another example, the network anomaly might be a leakage of quarantined communications off of a designated network path.

In an example deployment, a controller may install thousands of rules on network devices in a network. Each rule has a precedence value, and if a flow is found to match more than one rule, the rule with the highest precedence wins and the action corresponding to the winning rule is applied to the flow. A flow unexpectedly matching a rule with a higher precedence than the rule it was expected to match may result in a network anomaly.

The controller may receive flow counters from network devices. A flow counter may provide a count of the number of times a particular flow rule was matched by incoming packets. Such flow counters may provide insufficient information to identify a network anomaly or event to determine whether a network anomaly exists in the network.

Some aspects of the disclosed technology allow identification of network anomalies using flow rule sampling techniques. A flow rule may include a sampling rule indicating that sampling is enabled for flows matching the flow rule. Packet samples matching the sampling-enabled flow rule are transmitted to the network controller. The network controller may use the packet samples to identify unexpected network behavior of packet flows matching the flow rule.

Figure 1:
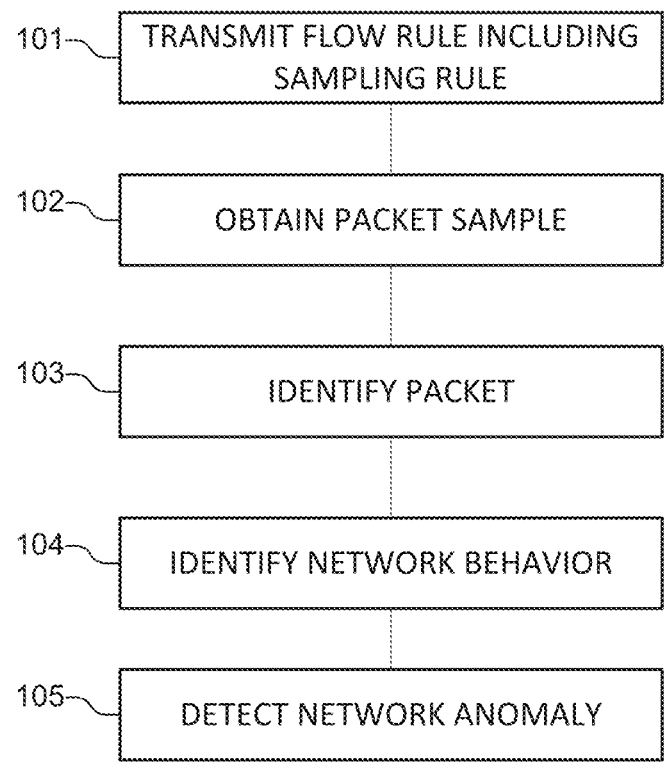
FIG. 1 illustrates an example method of detecting a network anomaly.

FIG. 1 illustrates an example method of identifying a network anomaly. For example, an SDN controller, such as an SDN controller implementing an OPENFLOW protocol, may perform the example method.

The method may include block 101. Block 101 may include the controller transmitting a flow rule to a network device. For example, the flow rule may be transmitted to an SDN-controlled network switch, such as a switch implementing an OPENFLOW protocol. The flow rule may include a sampling rule. The sampling rule may include sampling criteria indicating how packets matching the flow rule should be sampled. In some cases, the sampling rule may be an action of the flow rule. In other cases, the sampling rule may be an additional element of the flow rule. For example, the sampling rule may be contained in sampling related fields of the flow rule, such as a sampling enabled field that indicates whether or not sampling is enabled for the flow rule and a sampling criterion field that indicates how sampling will be performed on the flow matching the flow rule. For example, the sampling rule may instruct the network device to send a packet sample every n packets, where n is an integer. In other words, every nth packet that matches the flow rule is sampled and the sample is sent to the controller. As another example, the sampling rule may instruct the network device to send n packets after a time interval. For example, the sampling rule may instruct the network device to send n packets every s seconds.

In some implementations, block 101 may further include transmitting a second flow rule to a second network device, the second flow rule including a second sampling rule. A controller may transmit a set of flow rules to a set of network devices to implement a network policy. For example, a controller may transmit a set of flow rules to a corresponding set of network devices to implement a certain network path for packets from one client to another. Each flow rule of the set of flow rules may include a corresponding sampling rule. In some cases, the sampling rules may all have the same sampling criteria. In other cases, the sampling rules may have different sampling criteria.

The example method may further include block 102. Block 102 may include the controller obtaining a packet sample of a packet matching the flow rule. The packet sample may comply with the sampling rule included in the flow rule transmitted in block 101. For example, if a packet matches the flow rule and meets the sampling criteria, the network device may return a packet sample to the controller. A packet sample may be the entire sampled packet, the header of the sampled packet, or other set of packet information, such as a designated subset of the header.

In some cases, the controller may obtain the packet sample over an SDN control channel. In some implementations, the controller may obtain the packet sample in a packet-in message used by the network device to send packets to the controller. For example, the packet sample may use the same packet-in message formatted used by the network device to upload packets that do not match any of the device's flow rules. In other implementations, the controller may obtain the packet sample in a different message type, such as in a sample-specific message format. For example, the packet sample message may include information identifying the flow rule, a timestamp, or other information.

The example method may further include block 103. Block 103 may include using the packet sample to identify the packet. In some cases, identifying the packet may include identifying a source or destination of the packet, identifying a packet type, or identifying a preceding or next hop in the packet's network path. The information from the packet sample, such as source address, destination address, and packet type may be used to identify the packet. In some implementation, identifying the packet may include identifying a flow to which the packet belongs. For example, the controller may use packet information from the packet sample to identify a flow for the packet from stored flow information.

The example method may further include block 104. Block 104 may include identifying a network behavior for the packet. The network behavior may be information regarding how the packet was treated by the network to which the network device belongs. In some cases, the network behavior may be the action of the flow rule including the sampling rule. For example, the network behavior may be an indication of where the packet was forwarded, quality of service treatment of the packet, or header rewriting. In other cases, the network behavior may be information regarding how the packet was treated prior to arriving at the network device with the flow rule. For example, the network behavior may be information identifying which peer network device forwarded the packet to the network device having the flow rule.

The example method may further include block 105. Block 105 may include comparing the network behavior to an expected network behavior to detect a network anomaly. The expected network behavior may be an SDN treatment intended for the packet. In some cases, the expected network behavior may be determined by the controller using the identified packet to consult stored flow information. For example, the expected network behavior may be determined by using the identified packet to identify an expected flow rule that was expected to match the packet. The expected flow rule may be a flow rule programmed on the network device or a flow rule programmed on another network device. For example, if a flow rule X on network device A unexpectedly matches the packet, then device A may forward the packet to device B instead of the expected device C. In this case, block 105 may include identifying a flow rule on the expected device C that the packet was expected to match. The expected network behavior may be the action of the expected flow rule. For example, the expected network behavior may be an expected next hop, an expected network destination, or an expected network path.

A network anomaly may be detected if the network behavior identified in block 104 differs from the expected network behavior. In some cases, a network anomaly may be detected if the packet matches an unexpected flow rule. The unexpected flow rule may perform an unexpected action on the packet. For example, the packet's next hop may differ from the expected next hop, the packet's network destination may differ from the expected network destination, or the packet's network path may differ from the expected network path.

In some cases, if the network behavior is a network path, block 105 may include comparing the network path to an expected network path. In this case, the network anomaly may be a deviation from the expected network path. The deviation may be a network loop or packets from a client being forwarded off of a quarantined network path. For example, a packet may be unexpectedly matched by a higher priority flow rule than expected as a result of unexpected matching of wildcard fields. This may cause the packet to be forwarded back to a network device it had already visited, creating a network loop. As another example, using OPENFLOW rules, a client may have been quarantined but if there is a flow based sample from that client seen elsewhere in the network, it could indicate some kind of an anomaly in the network. For example, a flow rule that was programmed may not have the right match attributes to uniquely identify a client, creating packet leaks.

In some implementations, block 105 may include failing to receive a packet sample from another flow rule on the network. In some cases, if in block 101, a set of flow rules was transmitted to a set of network devices, block 105 may include failing to receive an expected packet sample from a flow rule of the set of flow rules. Failing to receive an expected packet sample from a flow rule on a network device may be used by the controller to identify the location of the network anomaly. As an example, the controller may transmit flow rule a to device A, flow rule b to device B, and flow rule c to device C to implement a network path from client x to client y, where device A forwards packets from client x to device B, device B forwards the packets to device C, and device C forwards the packets to client y. In this example, if the controller receives packet samples from devices A and B, but fails to receive packet samples from device C, this may indicate that a network anomaly is being created by flow rule programming on device B.

In some cases, upon detecting a network anomaly, the controller may repeat all or a portion of blocks 101-105. For example, upon performing block 105, the controller may identify a set of one or more network devices as having flow rules that are creating a network anomaly. To identify which flow rule is creating the anomaly, the controller may perform block 101 and resend any previously sent flow rules to the set of network devices with the addition of flow sampling rules. The controller may then perform blocks 102-105 on packet samples received from the set of network devices to determine which flow rule is causing the network anomaly.

As another example, upon detecting a network anomaly, the controller may repeat block 101 by re-transmitting the flow rule previously transmitted in the first iteration of block 101. The retransmitted flow rule may include an updated sampling rule with different sampling criteria. For example, the updated sampling rule may result in more frequent packet samples to provide more data. The additional packet samples may be used in block 105 to more precisely characterize the network anomaly.

Figure 2:
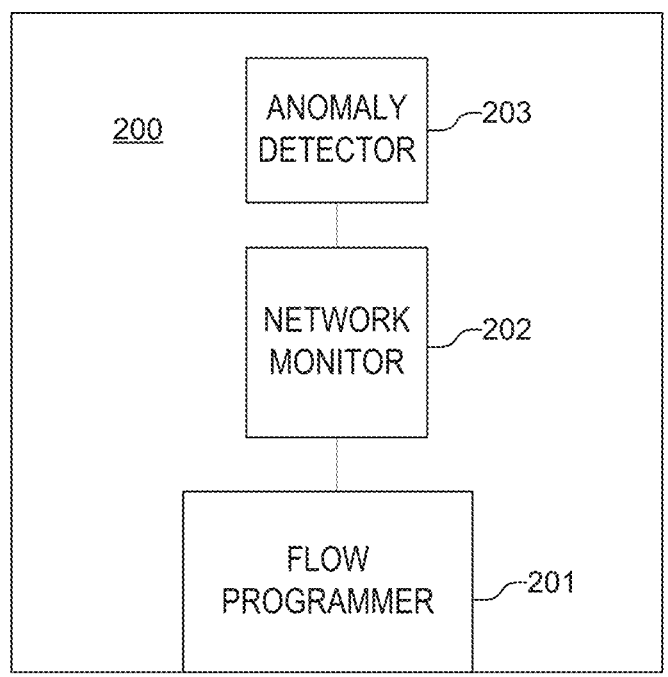
FIG. 2 illustrates an example network controller including an anomaly detector.

FIG. 2 illustrates an example network controller 200 including an anomaly detector 203 to detect a network anomaly using a packet sample. For example, the network controller 200 may be an SDN controller, such as an OPENFLOW controller, able to connect to one or more SDN-controlled network devices, such as bridges, routers, or switches. The example network controller 200 may include a flow programmer 201, a network monitor 202, and an anomaly detector 203. In various implementations, these modules may be implemented as software executable by a processor and stored on a non-transitory computer readable medium, as hardware, such as application-specific integrated circuits (ASICs) or field-programmable gate arrays (FPGAs), or as a combination of software and hardware.

The example network controller 200 may include a flow programmer 201. The flow programmer 201 may transmit a plurality of flow rules to a set of network devices. The set of network devices may be one or more SDN-controlled network devices of a network. For example, the flow programmer 201 may include an OPENFLOW stack or other SDN module and may transmit the plurality of flow rules as described with block 101 of FIG. 1. Accordingly, the plurality of flow rules may each include a corresponding sampling rule. In some cases, each corresponding sampling rule may have the same or different sampling criteria as the other sampling rules. For example, the corresponding sampling rule of a flow rule may instruct the network device to send n packet samples after a set time interval. As another example, the corresponding sampling rule of a flow rule may instruct the network device to send packet samples every n packets.

The example network controller 200 may also include a network monitor 202. The network monitor 202 may obtain a packet sample of a packet flow matching a flow rule of the plurality. For example, the network monitor may perform block 102 to obtain the packet sample. Additionally, the network monitor 202 may obtain packet samples from the entire set of network devices for packets meeting the sampling criteria of the programmed flow rules. As described with respect to block 102, the packet samples may include various data such as timestamps or flow identification information. In some cases, the packet samples may include packet headers. For example, the packet samples may include packet headers extracted from the packets or may include copies of the packets.

The example network controller 200 may also include an anomaly detector 203. The anomaly detector 203 may be configured to perform blocks 103-105 of FIG. 1. For example, the anomaly detector 203 may be configured to use the packet sample to detect a network anomaly by identifying a network behavior of the packet flow using the packet sample. For example, the anomaly detector 203 may check a packet sample to determine an expected flow rule expected to match the corresponding sample. The expected flow rule may be used to determine an expected network behavior for the packet. The expected network behavior may be compared to the actual network behavior to identify a network anomaly.

Figure 3:
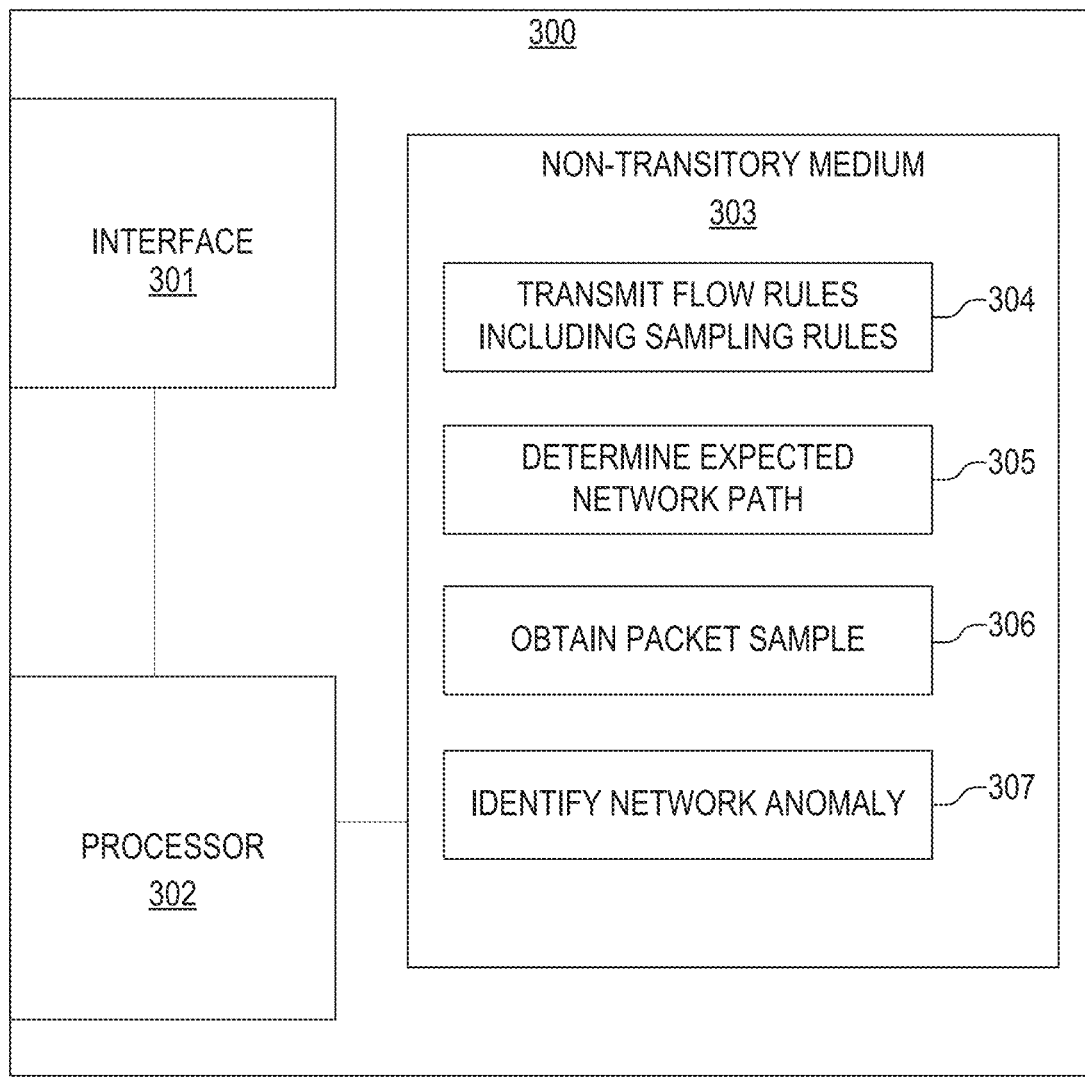
FIG. 3 illustrates an example network controller including a non-transitory computer readable medium storing instructions executable to identify a network anomaly.

FIG. 3 illustrates an example network controller 300. In some implementations, the example network controller 300 may be an implementation of the example network controller 200 of FIG. 2. The example network controller 300 may include a network interface 301 to connect to various SDN network devices. For example, the network interface 301 may be able to establish OPENFLOW control channel with a set of network devices.

The example network controller 300 may further include a non-transitory computer readable medium 303 storing instructions 304-307 executable by a processor 302 to identify a network anomaly. For example, the medium 303 may include random access memory (RAM), read only memory (ROM), flash memory, storage, or a combination thereof.

The instructions may include instruction set 304. Instruction set 304 may be executable by the processor 302 to transmit a set of flow rules to a plurality of network devices, the flow rules including corresponding sampling rules. For example, the instructions 304 may be executable by the processor 302 to transmit the flow rules to the network devices using the interface 301 as described with respect to block 101 of FIG. 1. As described herein, in some cases a sampling rule transmitted to a network device may instruct the network device to send packet samples every n packets, where n is an integer. In other cases, a sampling rule transmitted to a network device may instruct the network device to send n packet samples after a time interval, where n is an integer. In some cases, different flow rules of the set may include different sampling rule parameters. For example, n may differ between different flow rules. As another example, some sampling rules may be based on time intervals and other sampling rules may be based on packet intervals. In other cases, the set of flow rules may share the same sampling rule parameters.

The instructions may also include instruction set 305. Instruction set 305 may be executable by the processor 302 to determine an expected network path for a packet flow corresponding to a subset of the set of flow rules expected to match the packet flow. For example, the instruction set 305 may be executable by the processor 302 to consult flow tables to determine an expected network path for the packet flow. For example, the expected network path may be determined as described with respect to block 105 of FIG. 1.

The instructions may also include instruction set 306. Instruction set 306 may be executable by the processor 302 to obtain a packet sample of the packet flow from a network device of the plurality of network devices. For example, the instructions 306 may be executable by the processor 302 to obtain the packet sample via the network interface 301. In some implementations, the instructions 306 may be executable by the processor 302 to perform block 102 of FIG. 1.

The instructions may also include instruction set 307. Instruction set 307 may be executable by the processor 302 to identify a network anomaly using the packet sample to determine that a flow rule outside the subset matches the packet flow. For example, the flow rule outside the subset may be a flow rule programmed on a network device outside the expected network path. As another example, the flow rule outside the subset may be a flow rule programmed on a network device in the expected network path that has a higher priority than a flow rule of the subset. This higher-priority flow rule may have unexpectedly matched the packet corresponding to the packet sample, resulting in a network anomaly. This information may be used to identify a network anomaly such as a network loop and to identify which network devices are involved in the loop. For example, the processor 302 may execute instruction set 307 to perform blocks 104 and 105 of FIG. 1.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:
1. A method, comprising:
  transmitting a flow rule to a network device, the flow rule including a sampling rule indicating that sampling is enabled for flows matching the flow rule and including sampling criteria indicating how packets matching the flow rule should be sampled;
  obtaining, from the network device, a packet sample of a packet matching the flow rule, the packet sample complying with the sampling rule;
  using the packet sample to identify the packet;

identifying a network behavior for the packet, comprising identifying a network path of the packet; and comparing the network behavior to an expected network behavior to detect a network anomaly, comprising comparing the network path to an expected network path.

2. The method of claim 1, wherein the sampling rule instructs the network device to send packet samples every n packets, where n is an integer.

3. The method of claim 1, wherein the sampling rule instructs the network device to send n packet samples after a time interval, where n is an integer.

4. The method of claim 1, wherein the network anomaly is a network loop.

5. The method of claim 1, further comprising transmitting a second flow rule to a second network device, the second flow rule including a second sampling rule; and wherein identifying the network anomaly comprises failing to receive a second packet sample of a second packet matching the second flow rule.

6. A network controller, comprising:

a processor; and a non-transitory computer readable medium storing instructions executable by the processor to:

transmit a plurality of flow rules to a set of network devices, each flow rule including a corresponding sampling rule indicating that sampling is enabled for flows matching the flow rule and including sampling criteria indicating how packets matching the flow rule should be sampled;

obtain a packet sample of a packet flow matching a flow rule of the plurality;

identify a network behavior for the packet, comprising identifying a network path of the packet; and use the packet sample to detect a network anomaly by comparing the network behavior to an expected network behavior, comprising comparing the network path to an expected network path.

7. The network controller of claim 6, wherein the corresponding sampling rule of the flow rule of the plurality instructs the network device to send packet samples every n packets, where n is an integer.

8. The network controller of claim 6, wherein the corresponding sampling rule of the flow rule of the plurality instructs the network device to send n packet samples after a time interval, where n is an integer.

9. The network controller of claim 6, wherein the packet sample includes packet header information.

10. A non-transitory computer readable medium storing instructions executable by a processor to:

transmit a set of flow rules to a plurality of network devices, the flow rules including corresponding sampling rules that indicate sampling is enabled for flows matching the flow rule and including sampling criteria indicating how packets matching the flow rule should be sampled;

determine an expected network path for a packet flow corresponding to a subset of the set of flow rules expected to match the packet flow;

obtain a packet sample of the packet flow from a network device of the plurality of network devices;

identify a network behavior for the packet, comprising identifying a network path of the packet; and identify a network anomaly using the packet sample to determine that a flow rule outside the subset matches the packet flow by comparing the network behavior to an expected network behavior comprising comparing the network path to an expected network path.

11. The non-transitory computer readable medium of claim 10, wherein a sampling rule transmitted to a network device instructs the network device to send packet samples every n packets, where n is an integer.

12. The non-transitory computer readable medium of claim 10, wherein a sampling rule transmitted to a network device instructs the network device to send n packet samples after a time interval, where n is an integer.

13. The non-transitory computer readable medium of claim 10, wherein a first flow rule of the set of flow rules includes different sampling rule parameters than a second flow rule of the set of flow rules.

* * * * *